(12) United States Patent
Stoller

(10) Patent No.: US 9,000,359 B2
(45) Date of Patent: Apr. 7, 2015

(54) RADIATION DETECTOR FOR WELL-LOGGING TOOL

(71) Applicant: Schlumberger Technology Corporation, Sugar Land, TX (US)

(72) Inventor: Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 69 days.

(21) Appl. No.: 13/829,818

(22) Filed: Mar. 14, 2013

(65) Prior Publication Data

US 2014/0263997 A1    Sep. 18, 2014

(51) Int. Cl.
| | |
|---|---|
| *G01V 5/00* | (2006.01) |
| *G01V 5/04* | (2006.01) |
| *G01V 13/00* | (2006.01) |
| *G01T 1/20* | (2006.01) |

(52) U.S. Cl.
CPC ........ *G01V 5/04* (2013.01); *G01V 13/00* (2013.01); *G01T 1/20* (2013.01)

(58) Field of Classification Search
CPC ........... G01T 1/2018; G01T 1/20; G01V 5/04
USPC ........................................................ 250/256
See application file for complete search history.

(56) References Cited

U.S. PATENT DOCUMENTS

| | | | |
|---|---|---|---|
| 2,998,523 A * | 8/1961 | Muench et al. ................ 376/116 |
| 4,360,733 A | 11/1982 | Novak et al. | |
| 4,649,276 A | 3/1987 | Suzuki | |
| 4,772,792 A * | 9/1988 | Utts et al. ....................... 250/366 |
| H000590 H * | 2/1989 | Chiles et al. ................... 250/367 |
| 4,900,937 A | 2/1990 | Dayton et al. | |
| 4,994,673 A * | 2/1991 | Perna et al. ................. 250/483.1 |
| 5,070,249 A * | 12/1991 | White ......................... 250/483.1 |
| 5,481,114 A * | 1/1996 | Daniel et al. ............. 250/390.11 |
| 5,744,803 A * | 4/1998 | Grodsinsky et al. .......... 250/369 |
| 5,796,109 A | 8/1998 | Frederick et al. | |
| 6,222,192 B1 * | 4/2001 | Sekela et al. ............... 250/361 R |
| 6,300,624 B1 * | 10/2001 | Yoo et al. ....................... 250/254 |
| 6,359,282 B1 * | 3/2002 | Sekela ..................... 250/370.11 |
| 7,868,297 B2 * | 1/2011 | Saenger ..................... 250/361 R |
| 2002/0195564 A1 * | 12/2002 | Frederick et al. ......... 250/361 R |
| 2003/0209671 A1 * | 11/2003 | Frederick et al. ........ 250/363.01 |

(Continued)

FOREIGN PATENT DOCUMENTS

| | | | |
|---|---|---|---|
| CA | 2441438 A1 * | 3/2004 | |
| GB | 884356 | * | 8/1960 |

(Continued)

OTHER PUBLICATIONS

International Search Report & Written Opinion issued in PCT/US2014/018223 on Jun. 24, 2014; 13 pages.

*Primary Examiner* — Kiho Kim
(74) *Attorney, Agent, or Firm* — Cathy Hewitt

(57) ABSTRACT

A radiation detector is used in a well-logging tool for positioning in a wellbore of a geologic formation. The radiation detector includes a photomultiplier housing and a scintillator housing. A housing coupler joins together opposing ends of the photomultiplier housing and scintillator housing. A photomultiplier is contained within the photomultiplier housing and a scintillator body is contained within the scintillator housing. A scintillator window is secured to the housing coupler.

20 Claims, 4 Drawing Sheets

(56) References Cited

U.S. PATENT DOCUMENTS

| | | | |
|---|---|---|---|
| 2008/0142718 A1* | 6/2008 | Mormann et al. | 250/361 R |
| 2009/0095910 A1* | 4/2009 | Jones et al. | 250/361 R |
| 2011/0155896 A1* | 6/2011 | Bush | 250/239 |
| 2012/0228472 A1* | 9/2012 | Simonetti et al. | 250/207 |
| 2012/0241637 A1* | 9/2012 | Simonetti et al. | 250/390.11 |
| 2014/0084150 A1* | 3/2014 | Stephenson | 250/269.1 |
| 2014/0097345 A1* | 4/2014 | Gayshan | 250/361 R |

FOREIGN PATENT DOCUMENTS

| | | |
|---|---|---|
| WO | 2010135303 A2 | 11/2010 |
| WO | 2012058569 A2 | 5/2012 |
| WO | 2013016145 A1 | 1/2013 |

\* cited by examiner

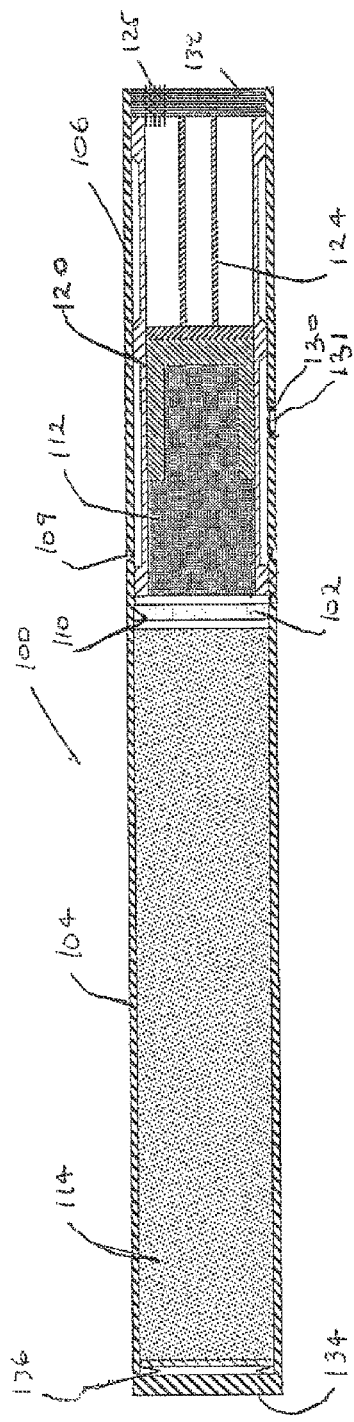
F.G. 2
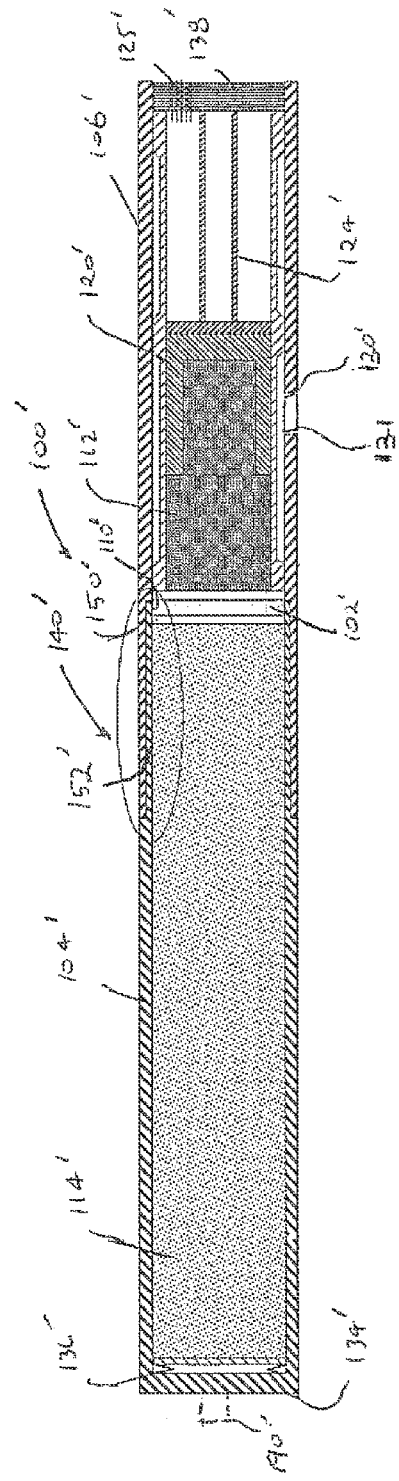
F.G. 3

RADIATION DETECTOR FOR WELL-LOGGING TOOL

BACKGROUND

Some well-logging tools include a radiation detector having a scintillator coupled to a photomultiplier, which converts photons emitted from the scintillator into an electrical current for amplification. A scintillator window is positioned between the scintillator and photomultiplier. Because the scintillator and photomultiplier may be exposed to high temperatures, harsh downhole environments and excessive shock during well-logging, the scintillator and photomultiplier are contained in at least one protective housing to provide shock resistance, provide a temperature resistant seal, and accommodate differential expansion during temperature changes among the scintillator, photomultiplier, the housing and scintillator window. Also, the scintillator and photomultiplier are coupled together in a manner to maximize a diameter of the scintillator compared to the total diameter of the housing. In some cases, instead of a single housing supporting the scintillator and photomultiplier, a scintillator housing and photomultiplier housing contain the respective scintillator and photomultiplier to facilitate assembly and functional operation. The scintillator is used in well-logging tools for gamma ray measurements, natural gamma ray spectroscopy, gamma-gamma density measurement, neutron induced gamma ray spectroscopy and scintillator-based neutron detection. In well-logging, the scintillator may detect naturally occurring radioactive materials such as thorium, uranium and potassium and their radioactive decay products.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation detector includes a photomultiplier housing and a scintillator housing. A housing coupler joins opposing ends of the photomultiplier housing and scintillator housing together. A photomultiplier is contained within the photomultiplier housing and a scintillator body is contained within the scintillator housing. A scintillator window is secured to the housing coupler.

A well-logging tool for positioning in a wellbore of a geologic formation includes a well-logging housing and a radiation detector contained in the well-logging housing. The radiation detector includes a photomultiplier housing and a scintillator housing. A housing coupler joins opposing ends of the photomultiplier housing and scintillator housing together. A photomultiplier is within the photomultiplier housing. A scintillator body in within the scintillator housing. A scintillator window is within the scintillator housing. A brazed joint secures the scintillator window and the housing coupler. The scintillator window includes a first material having a first CTE. The housing coupler includes a second material having a second CTE that is within ±20% of the first CTE.

A method for making a radiation detector includes securing a scintillator window and a housing coupler together. The method further includes joining opposing ends of a photomultiplier housing and scintillator housing together using the housing coupler, and with a photomultiplier within the photomultiplier housing and the scintillator body within the scintillator housing.

BRIEF DESCRIPTION OF THE DRAWINGS

FIG. 2 is a sectional view of a radiation detector used in a well-logging tool that includes a scintillator window and a scintillator housing joined to a photomultiplier housing in accordance with a non-limiting example.

FIG. 3 is a sectional view of another embodiment of the radiation detector showing the scintillator window secured within the scintillator housing and the photomultiplier housing joined to the scintillator housing an overlapping joint in accordance with a non-limiting example.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

A radiation detector includes a photomultiplier housing and a scintillator housing. A housing coupler joins opposing ends of the photomultiplier housing and scintillator housing together. A photomultiplier is contained within the photomultiplier housing and a scintillator body is contained within the scintillator housing. A scintillator window is secured to the housing coupler.

In well-logging applications, it has been found desirable to couple the scintillator directly to a faceplate of the photomultiplier with an optical window such as a scintillator window mounted to the housing and positioned between the scintillator and photomultiplier. In this type of design, the scintillator window is secured to the housing, for example, by brazing or other fastening technique that may require high heat of up to 700° C. to 800° C.

In one example, a brazed joint secures the scintillator window and the housing coupler together. In another example, the housing coupler defines an enlarged inner diameter relative to the scintillator housing. The scintillator window has a larger area than an adjacent portion of the scintillator body. The scintillator window may be formed from a first material having a first Coefficient of Thermal Expansion (CTE) and the housing coupler may be formed from a second material having a second CTE that is within ±20 percent of the first CTE. The first material may be formed from sapphire and the second material may be formed from Kovar.

Figure 1:
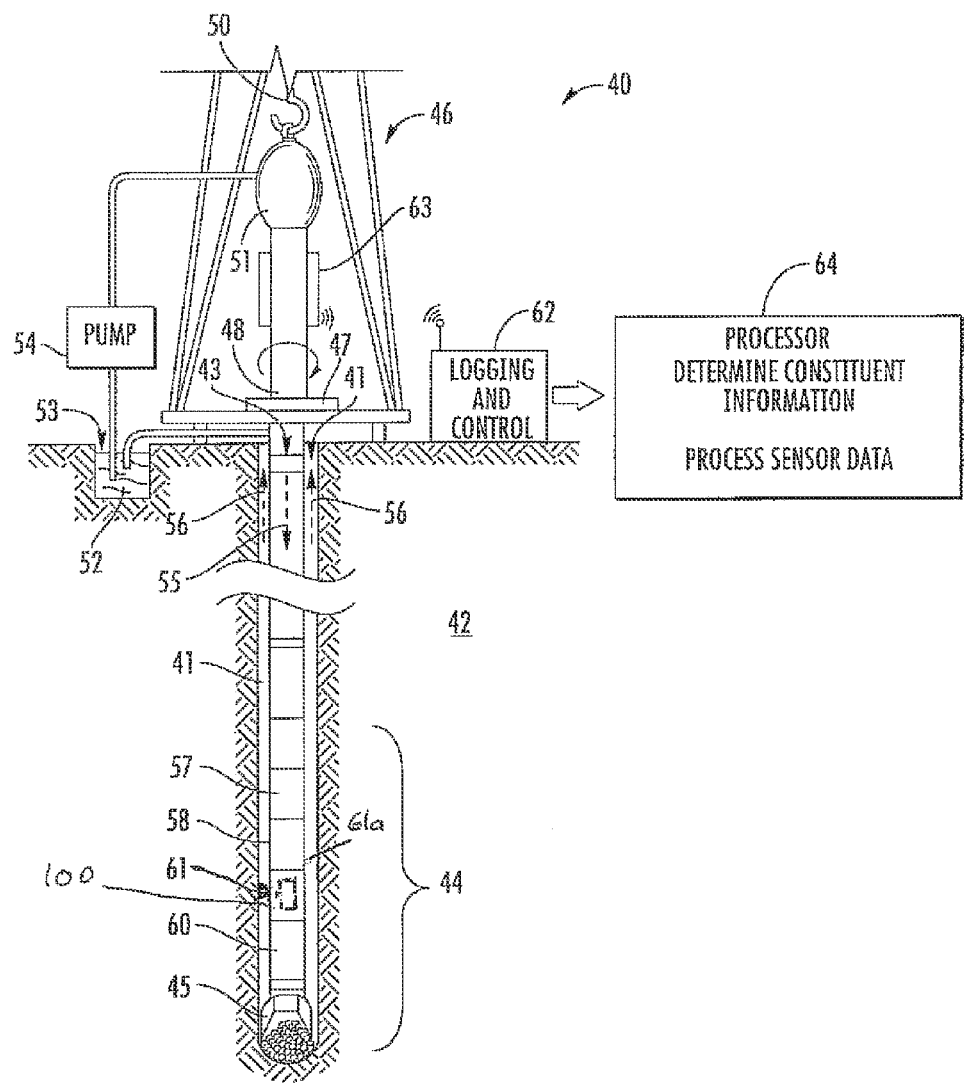
FIG. 1 is a schematic diagram of a well-logging system in accordance with an example embodiment.

In another example, the photomultiplier housing is formed from a third material having a third CTE. The scintillator housing may be formed from a fourth material having a fourth CTE lower than the first CTE. The third material may be formed from stainless steel and the fourth material may be formed as titanium. In another example, the housing coupler defines respective overlapping joints with the photomultiplier housing and the scintillator housing. In another example, a photomultiplier window is within the photomultiplier housing. The photomultiplier housing may have a vent opening and at least one plug associated to plug the vent opening FIG. 1 illustrates a well site system 40 in which various embodiments of the radiation detector 100 that may be used in well-logging and described below may be implemented. In the illustrated example, the well site 40 is a land-based site, but the techniques described herein may also be used with a water or offshore-based well site as well. In this example system, a borehole 41 is formed in a subsurface or geological formation 42 by rotary drilling, for example. Some embodiments may also use directional drilling.

Although this description proceeds with the description of a Drilling and Measurement (D&M) system that includes a drill string, it should be understood that a wireline drilling and logging system may be used. Also, slickline, coiled tube conveyed or drill pipe conveyed logging may be used. The radiation detector as described below may be used with either system.

A drill string 43 is suspended within the borehole 41 and has a bottom hole assembly ("BHA") 44 which includes a drill bit 45 at its lower end. The system 40 further includes a platform and derrick assembly 46 positioned over the borehole 41. The assembly 46 illustratively includes a rotary table 47, kelly 48, hook 50 and rotary swivel 51. The drill string 43 in this example may be rotated by the rotary table 47, which engages the kelly 48 at the upper end of the drill string. The drill string 43 is illustratively suspended from the hook 50, which is attached to a traveling block (not shown). The kelly 48 and the rotary swivel 51 permits rotation of the drill string relative to the hook. A top drive system (not shown) may also be used to rotate and axially move the drill string 43, for example.

In the present example, the system 40 may further include drilling fluid or mud 52 stored in a pit 53 formed at the well site (or a tank) for such purpose. A pump 54 delivers the drilling fluid 52 to the interior of the drill string 43 via a port in the swivel 51, causing the drilling fluid to flow downwardly through the drill string as indicated by the directional arrow 55. The drilling fluid exits the drill string 43 via ports or nozzles (not shown) in the drill bit 45, and then circulates upwardly through an annular space ("annulus") between the outside of the drill string and the wall of the borehole, as indicated by the directional arrows 56. The drilling fluid lubricates the drill bit 45 and carries formation cuttings up to the surface as it is cleaned and returned to the pit 53 for recirculation.

The BHA 44 of the illustrated embodiment may include a logging-while-drilling ("LWD") module 57, a measuring-while-drilling ("MWD") module 58, a rotary steerable directional drilling system and motor 60, and the drill bit 45. These modules are part of downhole tubulars formed from respective housings as illustrated. It should be understood that the mode of conveyance is not limited to a BHA 44 for a MWD or LWD or wireline. Other modes of conveyance include slickline, coiled tubing conveyed or drill pipe conveyed logging.

The LWD module 57 may be housed in a special type of drill collar, as is known in the art, and may include one or more types of well-logging instruments, including the example radiation detectors 100. It will also be understood that optional LWD and/or MWD modules 61 may also be used in some embodiments that include the radiation detector 100 having a scintillator and photomultiplier as described below. (References, throughout, to a module at the position of 57 may mean a module at the position of 61 as well). The module 61 has a pressure housing as a well-logging housing 61a containing the radiation detector 100 shown in dashed lines and other down hole tool components to form a well-logging tool. The LWD module 57 may include capabilities for measuring, processing, and storing information, as well as for communicating the information with the surface equipment, e.g., to a logging and control unit 62, which may include a computer and/or other processors for decoding information transmitted from the MWD and LWD modules 57, 58 and recording and calculating parameters therefrom. The information provided by the MWD and LWD modules 57, 58 may be provided to a processor 64 (which may be off site, or in some embodiments may be on-site as part of the logging and control unit 62, etc.) for determining volumetric and other information regarding constituents within the geological formation 42 and process sensor data collected from sensors located in different modules.

A wireline cable may be used instead that includes a standard cable head connected at its lower end to a logging tool with a wireline cable extending to the surface of the borehole. During a logging operation, data may be transmitted from the logging tool to the wireline cable through the cable head and into the logging and control system 62 such as shown in FIG. 1. The downhole tubular may include one or more pressure bulkheads that enclose a protected area as an enclosure for a module and contain the electronic devices such as the radiation detector, including sensors for downhole logging and processors and other electronics. The bulkhead may form a pressure housing as part of the downhole tubular.

FIG. 2 is a sectional view of the radiation detector 100 as a detector module that may be within the well-logging tool in accordance with a non-limiting example and showing a scintillator window 102 secured within a scintillator housing 104. A photomultiplier housing 106 is secured to the scintillator housing 104 by a weld joint 109 in this example. A brazed joint 110 secures the scintillator window 102 to the scintillator housing 104 in this non-limiting example. A photomultiplier 112 is secured within the photomultiplier housing 106. The end of the scintillator housing 104 extends past the scintillator window 102 and butts against the end of the photomultiplier housing 106 to which it is welded. The photomultiplier 112 within the photomultiplier housing 106 extends to the scintillator window 102. The scintillator body 114 is received within the scintillator housing 104. The photomultiplier housing 106 butts against the scintillator housing 104 at a distance of 0.5 inches in this non-limiting example from the scintillator window 102, thus assuring that the welled process does not heat the scintillator window or the scintillator body 114 inside the scintillator housing 104 if it is present during the well process and damage the scintillator window 102 or an optical coupling outside the scintillator window or the components of the scintillator body.

The photomultiplier 112 may include a high voltage supply 120 and a preamplifier and high voltage control circuit 124. Other ancillary electronics may be included around the photomultiplier 112 but not inside, including a pulse height analyzer, multi-channel scaler (MCS), a battery and a memory device to allow autonomous recording of ionizing radiation. The photomultiplier 112 includes a vacuum envelope that contains normal components of the photomultiplier. A feedthrough connector is shown at 125. The photomultiplier housing 106 and scintillator housing 104 may serve as the outer housings of the radiation detector without requiring an additional pressure housing. Usually, there will be a pressure housing such as shown in FIG. 1, which may contain additional components of a downhole tool. Together, these two housings 104, 106 may be used in wireline or slickline applications and in LWD and MWD or coiled tubing or drill pipe conveyed logging where the well-logging tool formed from the scintillator housing 104 and photomultiplier housing 106 may be mounted on the outside of a drill collar or as part of a mandrel inside a mud channel without requiring pressure protection. Different types of photomultipliers 112 may be incorporated within the photomultiplier housing 106, but one example is the Venetian blind type of photomultiplier that withstands harsh environmental conditions associated with well-logging. The scintillator window 102 is brazed to the scintillator housing 104 in this example, but an adhesive may also be used in some examples, and in another example, a glue or glass frit may be used to form a seal.

The scintillator body 114 is formed as a hygroscopic scintillator in this non-limiting example, but may be formed as a non-hygroscopic scintillator in another example. An example scintillator is made from a hygroscopic material such as NaI(Tl), SrI$_2$(Eu), LaBr$_3$:Ce, LaCl$_3$:Ce, CeBr3, CsI(Na), CsI(Tl), and mixed La-halides. Non-hygroscopic materials may be used to form a non-hygroscopic scintillator, including BGO, GSO:Ce, LSO:Ce, YAP:Ce, LuAP:Ce, YAG:Pr, LuAG:Pr and many others. The method of construction is not limited to gamma ray detectors but applies also to scintillators suited for neutron detection such as Li-glass or newer materials such as Elpasolites.

The radiation detector 100 in the example of FIG. 2 may be formed by initially securing the scintillator window 102 and scintillator housing 104 together. The brazed joint 110 secures together the scintillator window 102 to the scintillator housing 104 in the example. Because brazing may use heating to as high as 700° C. to 800° C., the scintillator window 102 is first brazed within the scintillator housing 104 since the high heat from brazing may damage the scintillation crystal contained in the scintillator body 114. Other components include an optical coupling with the scintillator window 102, reflecting material an optional shock absorbing material, and an electric element positioning the scintillator body 114 against the scintillator window such as a spring. In the example of FIG. 2, after securing the scintillator window 102 to the scintillator housing 104 by brazing, the opposing ends of the photomultiplier housing 106 and scintillator housing 104 may be secured by welding the two housings together with or without the scintillator body 114 and photomultiplier 112 inserted therein.

In one example, after the scintillator window 102 is brazed to the scintillator housing 104, the photomultiplier housing 106 is joined to the scintillator housing 104. The scintillator body 114 may next be positioned within the scintillator housing 104 and the photomultiplier 112 positioned within the photomultiplier housing 106. This sequence of assembly steps may vary, however. For example, the scintillator body 114 may be positioned within the scintillator housing 104 prior to joining opposing ends of the photomultiplier housing 106 and scintillator housing 104 together. In another example, the scintillator body 114 may be positioned within the scintillator housing 104 after joining opposing ends of the photomultiplier housing 106 and scintillator housing 104 together. The photomultiplier 112 may be positioned within the photomultiplier housing 106 prior to joining opposing ends of the photomultiplier housing 106 and scintillator housing 104 together. In yet another example, the photomultiplier 112 may be positioned within the photomultiplier housing 106 after joining opposing ends of the photomultiplier housing 106 and scintillator housing 104 together.

In the example shown in FIG. 2, the photomultiplier housing 106 has at least one vent opening 130, which allows air to escape as the photomultiplier 112 is inserted within the photomultiplier housing 106 and pressed against the scintillator window 102. This facilitates insertion of the photomultiplier 112. The vent opening 130 may be plugged using a plug 131 although the plug in some instances may not be used. The plug 131 may or may not provide a hermetic seal after positioning the photomultiplier 112 within the photomultiplier housing 106 depending on design. After the scintillator body 114 is positioned within the scintillator housing 104, an end cap 134 is received on the end of the scintillator housing 114 to hold the scintillator body 114 within the scintillator housing 104. A spring or other biasing member 136 may be inserted between the end cap 134 and the scintillator body 114 to bias the scintillator body 114 forward against the scintillator window 102 as illustrated in FIG. 2. An end cap 138 may be placed at the end of the photomultiplier housing 106 to hold the photomultiplier 112 within the housing. An intervening optical coupling material such as a pad or optical shock absorbing material or both may be made between a photomultiplier window and the scintillator window 102. This assures enhanced light transmission to a photocathode on the inside of the photomultiplier window.

An example material for the scintillator housing 104 may be titanium or other similar material for better gamma ray transmission and compatible with the scintillator window material 102 to allow a stable hermetic seal that will not break with temperature changes. Other materials may include a material with a low atomic number Z and a low density. Example materials may include beryllium and may include carbon fiber structures. The photomultiplier housing 106 may be formed from a structural material such as stainless steel. It is possible to make the parts of the photomultiplier 112 from a material of high magnetic permeability such as AD-MU-80 or AD-MU-48 material from AD-Vance Magnetics, Inc. of Rochester, Ind. to shield the photomultiplier 112 against magnetic fields.

FIG. 3 is another embodiment of the radiation detector 100' similar to the embodiment shown in FIG. 2, but using an overlapping joint instead of a butt weld joint to secure the scintillator housing 104' to the photomultiplier housing 106'. As illustrated, the ends of the photomultiplier housing 106' and the scintillator housing 104' form at least one overlapping joint indicated generally at 140' and shown by the circled portion to highlight the area of the overlapping joint 140'. In this example, the photomultiplier housing 106' has a thinner end portion 150' that extends past the scintillator window 102' and overlaps a thinner end portion 152' of the scintillator housing 104'. The two thinner end portions 150', 152' are secured to each other preferably by welding as a non-limiting example although it is possible to use an adhesive and other fastening techniques.

Figure 4:
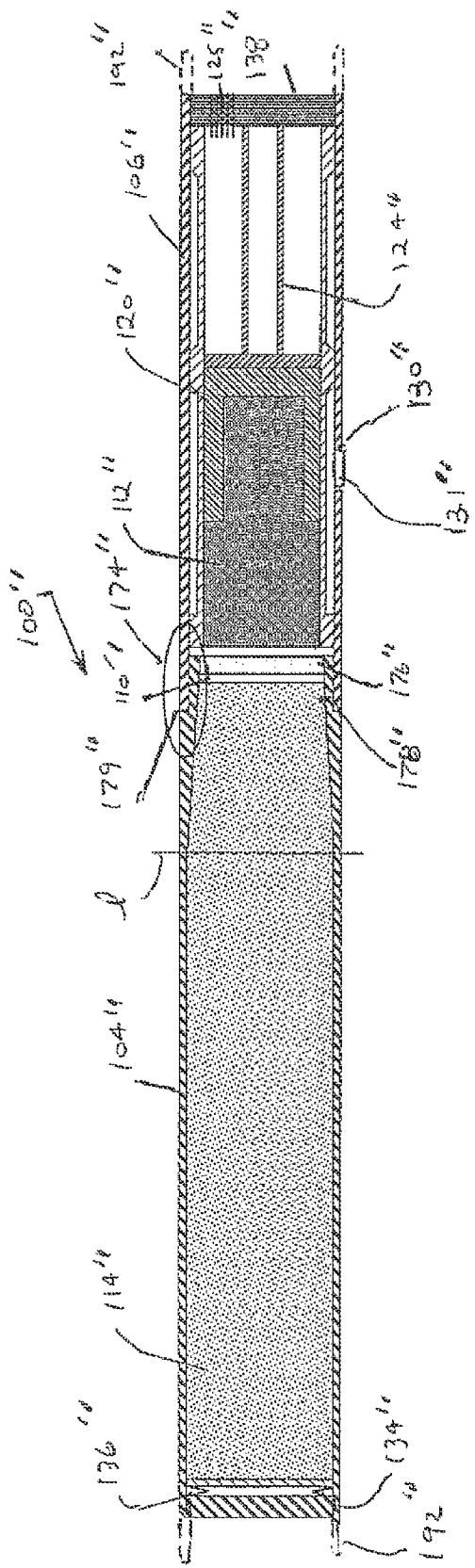
FIG. 4 is a sectional view of another embodiment of the radiation detector showing another overlapping joint between the scintillator housing and photomultiplier housing in accordance with a non-limiting example.

FIG. 4 is an example of the radiation detector 100" similar to FIG. 3 that also includes at the illustrated oval an overlap joint generally at 174", but showing a beveled scintillator window 176" and an internal bevel 178" on the scintillator housing 104". The end portion of the scintillator housing 104" is thickened to accommodate the bevel. The thickened portion that forms the bevel 178" may have threads to allow the photomultiplier housing 106" to be screwed onto the scintillator housing 104". Welding at the weld joint 179" at the overlap joint 174" forms a better hermetic seal. In this example, the internal bevel 178" begins at the vertical line (1) extending through the scintillator housing 104".

Figure 5:
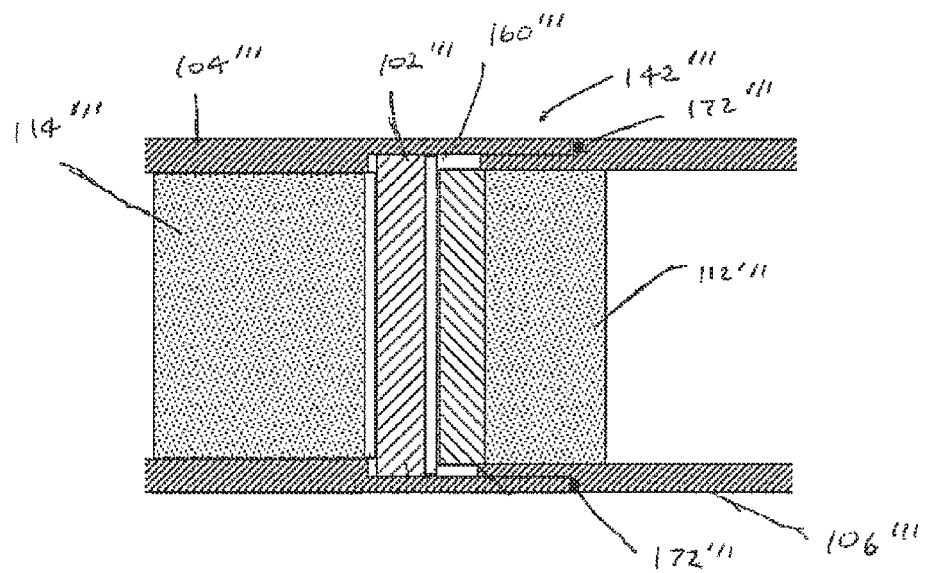
FIG. 5 is a partial, enlarged sectional view of the radiation detector showing another overlapping joint between the photomultiplier housing and scintillator housing in accordance with a non-limiting example.

It should be understood that it is possible for the scintillator housing 104''' to have an extended thinner section that extends past the scintillator window 102''' and overlaps a portion of the photomultiplier housing 106''' as shown in the enlarged sectional view in FIG. 5 where an overlap joint 142''' is formed. The scintillator housing 104''' may include an enlarged inner diameter section 160''' formed by the overlap joint 142''' relative to adjacent sections receiving the scintillator window 102''' such that the scintillator window 102''' has a larger area than an adjacent portion of the scintillator body 114''' to allow more light to be collected and passed into the photomultiplier 112'''. The scintillator housing 104''' may be secured to the photomultiplier housing 106''' by a weld joint 172''' at the overlap seal 142''' in this example to form a hermetic seal.

Figure 6:
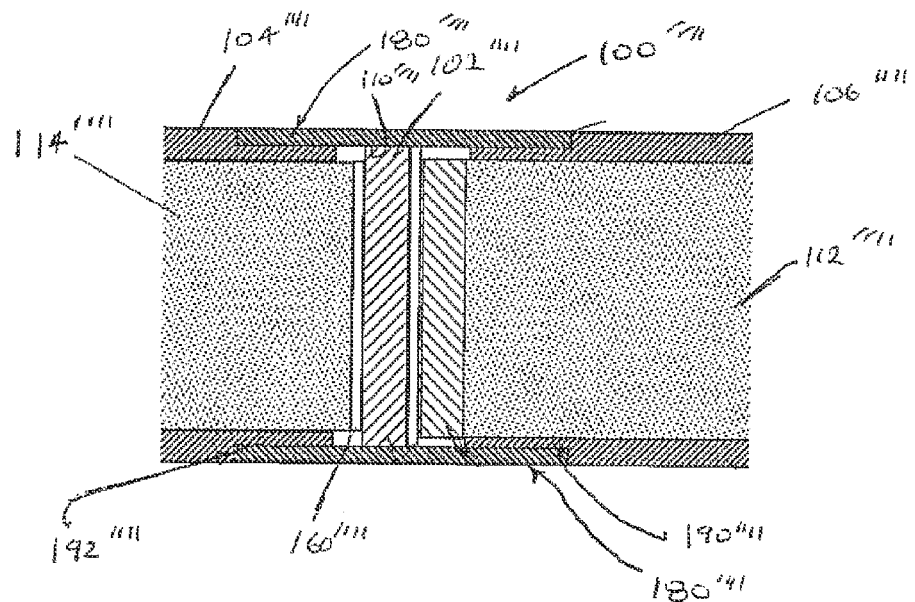
FIG. 6 is a partial, enlarged sectional view of the radiation detector showing a housing coupler joining opposing ends of the photomultiplier housing and scintillator housing together in accordance with a non-limiting example.

FIG. 6 is an enlarged sectional view of another embodiment of the radiation detector 100'''' that includes a housing coupler 180'''' that joins the ends of the photomultiplier housing 106'''' and scintillator housing 104'''' together. In this example, the scintillator window 102'''' is secured to the housing coupler 180'''' such as using a brazed joint 110'''. As illustrated, the housing coupler 180'''' defines an enlarged inner diameter 160'''' relative to the scintillator housing 104''''. The scintillator window 102'''' has a larger area than an adjacent portion of the scintillator body 114'''' to allow more light to pass and be collected at the photomultiplier 112''''. In one example, the scintillator window 102'''' is formed from a first material having a first Coefficient of Thermal Expansion (CTE) and the housing coupler 180'''' is formed from a second material having a second CTE that is within ±20 percent of the first CTE.

In another example, the first material forming the scintillator window 102'''' is sapphire and the second material forming the housing coupler 180'''' is Kovar. The expansion characteristics of Kovar match sapphire, borosilicate and Pyrex glass and other materials used for scintillator windows so that the materials may shrink and expand in a similar manner as environmental conditions change during assembly and well-logging without causing the scintillator window 102'''' to come apart from the housing coupler 180'''' or expand into the coupler and shatter. In another example, the photomultiplier housing 106''' is formed from a third material having a third CTE and the scintillator housing 104'''' is formed from a fourth material having a fourth CTE lower than the first CTE. For example, the third material forming the photomultiplier 112'''' could be a stainless steel and the fourth material forming the scintillator housing 104'''' could be titanium as discussed above. The housing coupler 180'''' has an overlapping joint 190'''' with the photomultiplier housing 106'''' and another overlapping joint 192'''' and the scintillator housing 104'''' as shown in FIG. 6. The photomultiplier housing 106'''' in this example also includes at least one vent opening (not shown) and a plug associated therewith to facilitate insertion of the photomultiplier 112'''' into the photomultiplier housing 106'''' as described before.

It is possible to include a stud 190' on one side of the scintillator housing 104' such as shown in dashed lines of FIG. 3 to permit direct mounting of the scintillator housing 104' on another part. It is also possible to include extensions 192" on both the photomultiplier housing 108" and scintillator housing 104" for external attachments as shown in the dashed lines of FIG. 4.

This application is related to copending patent U.S. patent application Ser. No. 13/829,689 entitled, "METHOD OF MAKING A WELL-LOGGING RADIATION DETECTOR," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radiation detector comprising:
   a photomultiplier housing;
   a scintillator housing;
   a housing coupler joining opposing ends of said photomultiplier housing and scintillator housing together, wherein the housing coupler forms a hermetic seal that hermetically seals the photomultiplier housing and the scintillator housing;
   a photomultiplier within said photomultiplier housing;
   a scintillator body within said scintillator housing; and
   a scintillator window secured to said housing coupler.

2. The radiation detector according to claim 1 further comprising a brazed joint securing said scintillator window and said housing coupler together.

3. The radiation detector according to claim 1 wherein said housing coupler defines an enlarged inner diameter relative to said scintillator housing; and wherein said scintillator window has a larger area than an adjacent portion of said scintillator body.

4. The radiation detector according to claim 1 wherein said scintillator window comprises a first material having a first CTE; and wherein said housing coupler comprises a second material having a second CTE that is within ±20 percent of the first CTE.

5. The radiation detector according to claim 4 wherein said first material comprises sapphire, and said second material comprises a nickel-cobalt ferrous alloy.

6. The radiation detector according to claim 1 wherein said photomultiplier comprises a third material having a third CTE; and wherein said scintillator housing comprises a fourth material having a fourth CTE lower than the third CTE.

7. The radiation detector according to claim 6 wherein said third material comprises stainless steel, and said fourth material comprises titanium.

8. The radiation detector according to claim 1 wherein said housing coupler defines respective overlapping joints with said photomultiplier housing and said scintillator housing.

9. The radiation detector according to claim 1 wherein said photomultiplier housing has at least one vent opening therein and at least one plug associated with the at least one vent opening.

10. A well-logging tool for positioning in a wellbore of a geologic formation comprising:
    a well-logging housing and;
    a radiation detector within the well-logging housing comprising,
        a photomultiplier housing;
        a scintillator housing;
        a housing coupler joining opposing ends of said photomultiplier housing and scintillator housing together, wherein the housing coupler forms a hermetic seal that hermetically seals the photomultiplier housing and the scintillator housing;
    a photomultiplier within said photomultiplier housing;
    a scintillator body within said scintillator housing;

a scintillator window within said scintillator housing; and
a brazed joint securing said scintillator window and said housing coupler together;
said scintillator window comprising a first material having a first CTE;
said housing coupler comprising a second material having a second CTE that is within ±20 percent of the first CTE.

11. The well-logging tool according to claim 10 wherein said housing coupler defines an enlarged inner diameter relative to said scintillator housing; and wherein said scintillator window has a larger area than an adjacent portion of said scintillator body.

12. The well-logging tool according to claim 10 wherein said first material comprises sapphire, and said second material comprises a nickel-cobalt ferrous alloy.

13. The well-logging tool according to claim 10 wherein said photomultiplier housing comprises a third material having a third coefficient of thermal expansion (CTE); and wherein said scintillator housing comprises a fourth material having a fourth CTE lower than the first CTE.

14. The well-logging tool according to claim 13 wherein said third material comprises stainless steel, and said fourth material comprises titanium.

15. The well-logging tool according to claim 10 wherein said housing coupler defines respective overlapping joints with said photomultiplier housing and said scintillator housing.

16. A method for making a radiation detector for a well-logging tool, the method comprising:

securing a scintillator window and a housing coupler together; and
joining opposing ends of a photomultiplier housing and scintillator housing together using the housing coupler, wherein the housing coupler forms a hermetic seal that hermetically seals the photomultiplier housing and the scintillator housing, and with a photomultiplier within the photomultiplier housing, and a scintillator body within the scintillator housing.

17. The method according to claim 16 wherein securing the scintillator window comprises forming a brazed joint to secure the scintillator window and the housing coupler together.

18. The method according to claim 16 wherein the housing coupler defines an enlarged inner diameter relative to the scintillator housing; and wherein the scintillator window has a larger area than an adjacent portion of the scintillator body.

19. The method according to claim 16 wherein the scintillator window comprises a first material having a first CTE; and wherein the housing coupler comprises a second material having a second CTE that is within ±20 percent of the first CTE.

20. The method according to claim 16 wherein the photomultiplier housing comprises a third material having a third CTE; and wherein the scintillator housing comprises a fourth material having a fourth CTE lower than the third CTE.

* * * * *